United States Patent [19]

Weiler et al.

[11] Patent Number: 4,650,039
[45] Date of Patent: Mar. 17, 1987

[54] SEALING CAP FOR A BOLT GUIDE OF A SPOT-TYPE DISC BRAKE

[75] Inventors: Rolf Weiler; Horst Kretzer, both of Frankfurt am Main; Hans-Dieter Leidecker, Eschborn, all of Fed. Rep. of Germany

[73] Assignee: Alfred Teves GmbH, Frankfurt am Main, Fed. Rep. of Germany

[21] Appl. No.: 736,290

[22] Filed: May 20, 1985

[30] Foreign Application Priority Data

May 19, 1984 [DE] Fed. Rep. of Germany ....... 3418804

[51] Int. Cl.$^4$ .............................................. F16D 15/52
[52] U.S. Cl. ............................ 188/73.44; 277/212 FB
[58] Field of Search ............... 188/73.31, 73.44, 73.45; 277/212 FB

[56] References Cited

U.S. PATENT DOCUMENTS

| 3,807,195 | 4/1974 | Faulbecker | 277/212 FB |
| 4,093,044 | 6/1978 | Unterberg | 188/73.45 |
| 4,235,313 | 11/1980 | Hirashita | 188/73.44 |
| 4,325,587 | 4/1982 | Seigert | 277/212 FB |
| 4,530,506 | 7/1985 | Weiler et al. | 277/212 FB |

Primary Examiner—Duane A. Reger
Assistant Examiner—Matthew C. Graham
Attorney, Agent, or Firm—James B. Raden; William J. Michals

[57] ABSTRACT

A protective cap (11) for a bolt guide of a spot-type disc brake, comprises an elastic (pleated) bellows, one end portion of which is fastened to the periphery of a first cylindrical part, while the other end portion thereof is secured to the periphery of a second cylindrical part. A rigid reinforcing and retaining member (15, 16) is provided on each one of said end portions (12, 13) with both reinforcing and retaining members being arranged with at least part of their radial extension on the same radius. To avoid damage to the cylindrical part and the guide surface thereof, at least one (16) of the reinforcing and retaining members is secured radially outwards at the corresponding end portion of the elastic bellows. Thus, an axially extending annular surface is formed which is free from the material of the elastic bellows and wherein the reinforcing and retaining members (16) together with this annular surface is arranged in press fit in a corresponding bore (20) of the associated cylindrical part.

1 Claim, 5 Drawing Figures

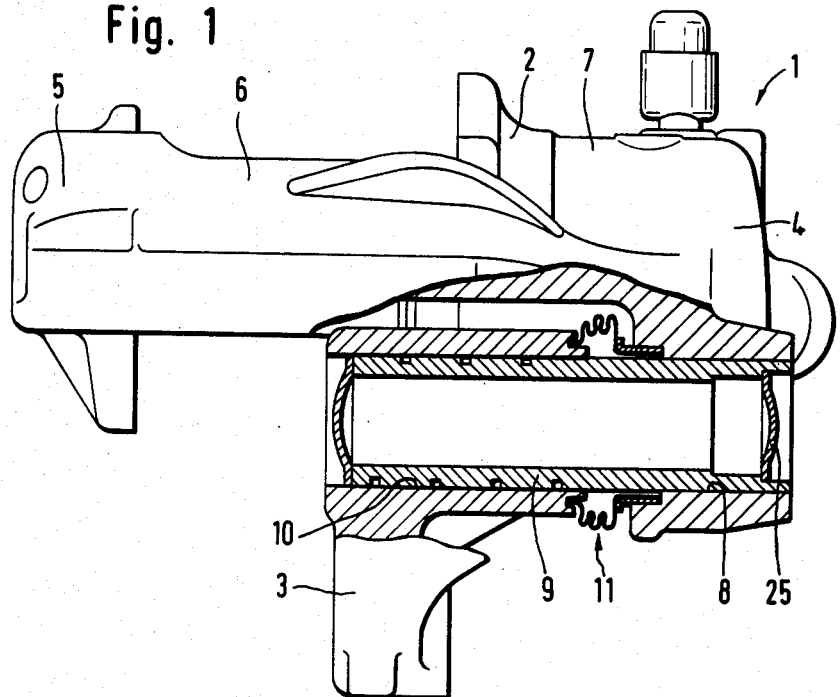
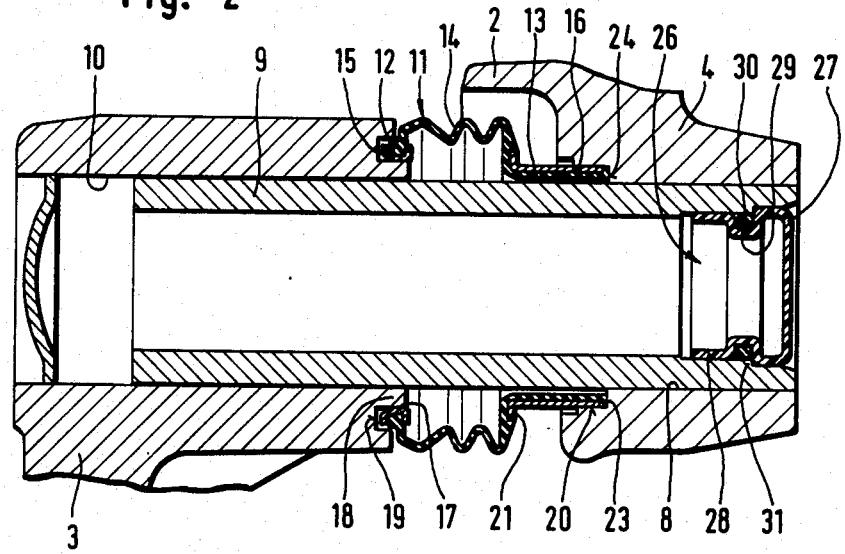

SEALING CAP FOR A BOLT GUIDE OF A SPOT-TYPE DISC BRAKE

BACKGROUND OF THE INVENTION

This invention relates to a sealing cap for cylindrical parts and more particularly, for a bolt guide of a spot-type disc brake. The invention comprises an elastic (pleated) bellows one end portion of which is adapted to be secured at the periphery of a first cylindrical part and the other end portion of which is adapted to be secured at the periphery of a second cylindrical part. A rigid reinforcing and retaining member is provided at each of said end portions, with the reinforcing and retaining members being arranged on the same radius with at least part of their radial extension.

Such a sealing cap is described in German patent application P 33 26 482.1 wherein one of the rigid reinforcing and retaining members is designed as an angular ring, the one leg of which is arranged in press fit directly on the associated cylindrical part. If the surface of the cylindrical part is delicate, this surface many suffer damage when mounting and dismounting the reinforcing and retaining member. If, for example, the sealing cap is inserted at the guide bolt of a disc brake, the guide surface may be impaired particularly if it is coated with slide-varnish. It is therefore an object of the present invention to provide a sealing cap which permits mounting and dismounting without impairing or damaging the cylindrical part and the guide surface thereof.

SUMMARY OF THE INVENTION

This object is achieved according to the present invention wherein at least one of the reinforcing and retaining members is secured radially outwards at the corresponding end portion of the elastic bellows, thus forming an axially extending annular surface which is free from the material of the elastic bellows. The reinforcing and retaining member is arranged with this annular surface in press fit in a corresponding bore of the associated cylindrical part. Accordingly, a sealing cap will be accomplished, in which the essential advantages according to patent application P 33 26 482.1, in particular the simple assembly, are preserved, while damage to and impairment of sliding surfaces is reliably precluded. This makes the use of such sealing caps in guide systems of disc brakes very favorable. Therefore, one embodiment of this invention provides for the bore to be a portion of a stepped bore in the caliper or the brake support member of a spot-type disc brake, the said stepped bore carrying a guide bolt or, respectively, a guide sleeve in another portion.

Expediently, the reinforcing and retaining member is of annular design. In order to preserve the assembling advantages without impairing the elastic end portions of the sealing cap, a favorable embodiment provides that the reinforcing and retaining member comprises projections axially penetrating the elastic bellows, in particular the end portion thereof. The projections are at least partially disposed on the same radius as the reinforcing and retaining member of the other end portion of the elastic bellows. For ease of manufacture and even force distribution, the projections are suitably furnished at a radially extending annular portion, while the reinforcing and retaining member is of substantially L-shaped configuration in longitudinal cross-section. Simplication of manufacture is obtained if the projections are designed as formed portions of the integral reinforcing and retaining member. The projections are arranged uniformly at the periphery for evenly distributing the forces over the periphery.

Another embodiment of the present invention provides for the elastic bellows to include a shoulder on at least one of its axial end portions, the shoulder extending radially over at least the radial dimensions of the retaining and reinforcing member. In other words, the elastic material of the end portion reaches up to the rear end face wherein it serves as a sealing surface.

In a very simple manner, the arrangement of the present invention provides servicing the sealing cap which can be dismounted easily without impairment of the guide arrangement. When using a hollow guide bolt as a guide element of a spot-type disc brake, the sheet-metal cap which is normally provided for closing the guide bolt cannot be reused when dismounted, since the seat for the sheet-metal cap which is normally disposed at the internal diameter of the hollow guide bolt will have become spoiled by corrosion. To top the servicing solution, it is therefore arranged for by an embodiment of this invention that the closure plug comprises a head and a substantially cylindrical portion for closure of an opening of a hollow guide bolt, that the cylindrical portion contains at its outer periphery an annular groove accommodating a sealing ring, and that the head is designed for abutment on a step of the opening. The closure plug is made of a suitable plastic material.

BRIEF DESCRIPTION OF THE DRAWING

The present invention will be described in more detail hereinbelow by way of embodiments illustrated in the accompany drawings wherein:

FIG. 1 is a side view, in partial section, of a spot-type disc brake on which the inventive sealing cap is used;

FIG. 2 is an enlarged view of the guide arrangement of the spot-type disc brake according to FIG. 1 with the sealing cap;

DETAILED DESCRIPTION

Figure 3:
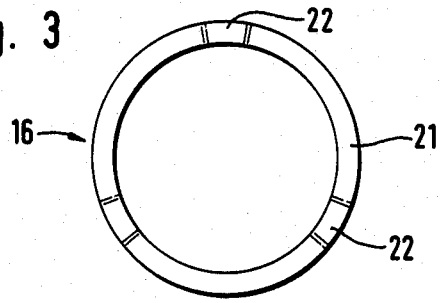
FIG. 3 is a front view of a reinforcing and retaining member.
Figure 4:
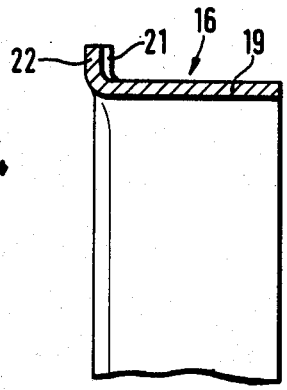
FIG. 4 is a longitudinal section through the reinforcing and retaining member of FIG. 3, and, FIG. 5 is an enlarged longitudinal section through the upper half of a sealing cap according to FIG. 2.
Figure 5:
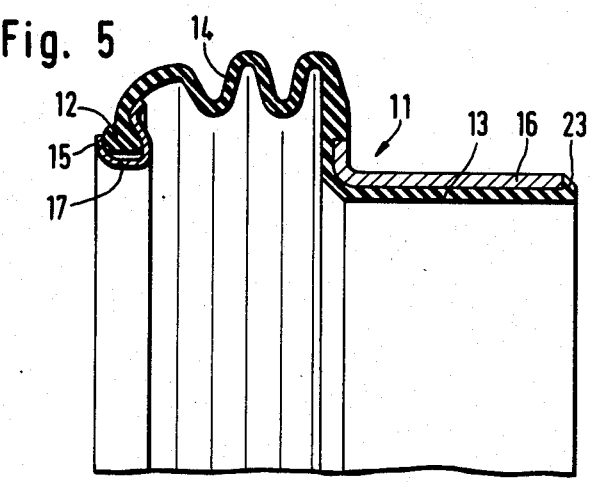

The spot-type disc brake 1 illustrated in FIG. 1 is substantially composed of a brake caliper 2 and of a brake support member 3 rigidly secured to the vehicle, the parts 2 and being interconnected by a guide arrangement. The brake caliper 2 comprises two radially extending legs 4, 5 interconnected via a bridging portion 6. Integrated into the leg 4 is an actuating device (not illustrated in FIG. 1) consisting of a piston-and-cylinder unit.

The guide arrangement of the spot-type disc brake comprises a hollow guide bolt 9 placed in press fit in a bore 8 of the brake caliper 2, the said guide bolt being axially slidably arranged in a guide bore 10 of the brake support member 3. To protect the guide surface of the guide bolt 9, there is provision of a sealing cap 11 which bridges the guide surface in the area between the end of the guide bore 10 and the bore 8.

Sealing cap 11 comprises a first end portion 12, a second end portion 13 as well as a pleated bellows portion 14 interconnecting the end portions 12, 13. Both end portions 12, 13 are furnished with relatively rigid, for instance metallic reinforcing and retaining members 15 and 16, respectively, which serve to fasten the wall portions of the sealing cap to the corresponding parts. The reinforcing and retaining member 15 is of U-shaped configuration in longitudinal section and embraces the end portion 12 like a bracket. With its base portion 17, it is secured on a cylindrical shoulder 18 of the brake support member 3, the said shoulder encompassing the guide bolt 9, and it is partially placed in a groove 19 adjacent to the cylindrical shoulder 18. The end portion 13 is of substantially L-shaped configuration in longitudinal cross-section, one part thereof extending substantially in parallel to the guide bolt 9, while the other part extends substantially vertically thereto. At its radially outwardly disposed side, the end portion 13 is furnished with a relatively rigid reinforcing and retaining member 16 which is coupled to the end portion 13 by being vulcanized thereinto. The reinforcing and retaining member which is shown in an enlarged view in FIGS, 3 and 4 is likewise of L-shaped configuration in longitudinal cross-section and is arranged radially outwardly above the end portion 13 of the sealing cap 11. It forms a cylindrical part 19, the end whereof is seated in press fit in a bore 20 of the brake caliper 2. A flange-like part 21 succeeding the cylindrical part 19 extends in the radially extending part of the end portion 13. Flange-like part 21 comprises projections 22 which extend axially to the reinforcing and retaining member 15, which penetrate the elastic end portion 13 and which are disposed at least partially on the same radius as the reinforcing and retaining member 15 so that the projections 22 can move directly into abutment on this reinforcing and retaining member 15 if the reinforcing and retaining member 16 is axially displaced in relation to the reinforcing and retaining member 15. Expediently, said projections 22 are shaped or formed portions of the integrally designed retaining and reinforcing member 16.

To form a sealing edge, the part of the end portion 13 which extends in parallel to the guide bolt 9 includes at its rear end a radial extension or, respectively, attachment 23 which is arranged between the end of the reinforcing and retaining member 16 and a step 24, the latter being formed by the stepped bore 20 with a view to bringing about sealing between the sealing cap and the bore.

The mounting of the sealing cap 11 is effected in a similar manner as in patent application No. P 33 26 482.1 That means, first the end portion 13 together with the reinforcing and retaining member 16 is secured in press fit in the bore 20. Then the end portion 12 together with the reinforcing and retaining member 15 is mounted on the cylindrical shoulder 18 of the brake support member. Subsequently, the guide bolt 9 is inserted into the guide bore 10, and the end portion 12 with the reinforcing and retaining member 15 is mounted on the cylindrical shoulder 18 of the brake support member and, on further axial displacement of the caliper with the guide bolt 9, will displace from the reinforcing and retaining member 16 up to its end position on the shoulder 18, while the projections 22 of the reinforcing and retaining member 16 move into abutment on the reinforcing and retaining member 15.

The present invention provides a very expedient solution for servicing which permits dismounting of the caliper and thus the sealing cap without impairing or damaging the guide surfaces of the guide arrangement. Since the sheet-metal cap 25 is normally seated in a stepped bore of the hollow carrier bolt 9 is does not allow corrosion of its heat surface. There is also provision of closure plug 26 composed of a head 27 and a substantially cylindrical portion 28, the latter containing at its outer periphery an annular groove 29 in which a sealing ring 30 is arranged. The sure plug 26 is inserted into the stepped bore so as to abut with its cylindrical portion 28 and with the sealing ring 30 on the bore ball so that the head 27 bears against the step 31 of the bore.

We claim:

1. A sealing cap for cylindrical parts such as a bolt guide of a spot-type disc brake, comprising an elastic bellows, one end portion of which is adapted to be secured at the periphery of a first cylindrical part and the other end portion of which is adapted to be secured at the periphery of a second cylindrical part, wherein one rigid reinforcing and retaining member is provided at each of said end portions with said reinforcing and retaining members being arranged on the same radius with at least part of their radial extension, wherein at least one (16) of the reinforcing and retaining members is secured radially outwardly at the corresponding end portion of the elastic bellows, thereby forming an axially extending annular surface which is free from the material of the elastic bellows, and wherein the reinforcing and retaining member (16) which is secured radially outwardly at said corresponding end portion of said elastic bellows is arranged with the annular surface in press fit in corresponding bore (20) of the associated cylindrical part, wherein the closure plug (26) comprises a head (27) and a substantially cylindrical portion (28) for closure of an opening of a hollow guide bolt (9) and wherein the cylindrical portion (28) has at its outer periphery an annular groove (29) accommodating a sealing ring (30), and wherein the head (27) abuts on a step of the opening.

* * * * *